April 18, 1939.   A. DE SAKHNOFFSKY   2,154,472
VELOCIPEDE CONSTRUCTION
Filed Jan. 29, 1937

INVENTOR.
ALEXIS DE SAKHNOFFSKY
BY Bates, Golrick, & Teare
ATTORNEYS

Patented Apr. 18, 1939

2,154,472

UNITED STATES PATENT OFFICE 2,154,472

VELOCIPEDE CONSTRUCTION

Alexis de Sakhnoffsky, Philadelphia, Pa., assignor to The Murray-Ohio Manufacturing Company, Cleveland, Ohio, a corporation of Ohio Application January 29, 1937, Serial No. 123,024

2 Claims. (Cl. 280—152.1)

This invention relates to a juvenile vehicle construction, and particularly to a child's velocipede or cycle. An important object is to provide an improved and strengthened front wheel and/or fender mounting for cycles of the class embracing velocipedes. A more specific object is to provide an improved fender bracing structure for velocipedes and the like. Still more specifically, an object is to brace more effectively the portion of a cycle fender which extends downwardly around the steering wheel from its usual point of attachment to the steering fork; and especially to prevent the fender from rubbing against the wheel.

Other objects and features of the invention will become apparent from the following description, relating to the accompanying drawing, which shows a preferred form. The essential characteristics are summarized in the claims.

Figure 1:
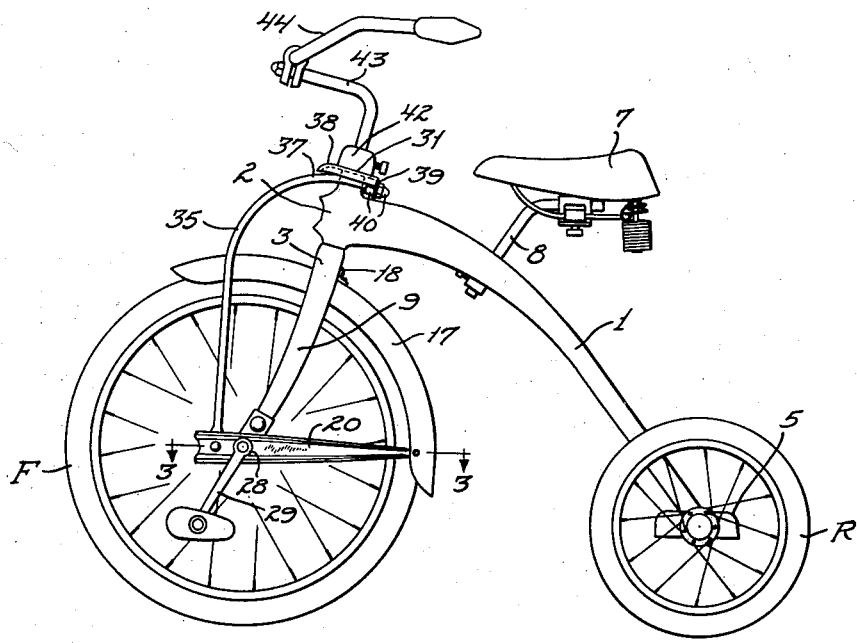
Figure 2:
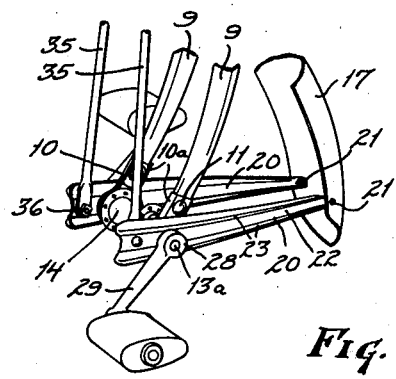
Figure 3:
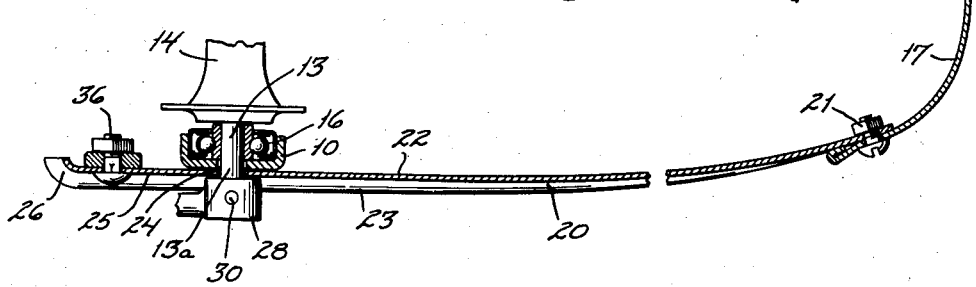

Referring briefly to the drawing, Fig. 1 is a side elevation of a velocipede embodying the invention; Fig. 2 is a fragmentary, perspective view showing the relationship of the more important parts of the present arrangement relative to each other; Fig. 3 is a partial, horizontal, sectional plan view taken on a plane substantially as indicated by the line 3—3 on Fig. 1.

Referring further to the drawing, the velocipede, as illustrated, comprises generally; A backbone 1, having a head portion 2 adapted to support bearings (not shown) for the supporting fork 3 for the front wheel F; the rear end of the backbone being arranged in suitable fashion to support the rear wheels R as by means of a crosspiece or bolster 5, which in turn supports the axle for said wheels. A suitable saddle 7 may be supported intermediately of the ends of the backbone as on a saddle post 8, adjustably mounted in the backbone.

Referring further to the fork 3, this has the usual upper stem (not shown) adapted to extend through appropriate bearings in the head 2 of the backbone, and downwardly extending spaced arms 9, the end portions of which are shown in Fig. 2. The arms, as shown, are provided at their lower ends with bearing shoes or brackets 10, which are secured to the lower ends of the arms as by side flanges 10a on the shoes embracing the respective arms, and fastening members 11, such as bolts or rivets, passing through respective arms and the bearing shoes. The shoes may carry bearings 16 (e. g. ball-bearing assemblies), one shown in Fig. 3, which bearings in turn carry the axle 13 having laterally projecting end portions 13a. The axle may be fastened to the hub 14 of the front wheel in the usual manner, as by being keyed thereto.

Near the upper crotch portion of the fork 3 is secured a curved sheet-metal fender 17, as by means of one or more clips 18. The fender may lie in uniformly spaced relation to the wheel, curving downwardly behind it as suggested in Figs. 1 and 2 and having side flanges shrouding the sides of the tire. The lower end of the fender is connected with the fork arms 9 by a pair of strut members 20, extending radially from the axle, the struts being fastened to respective flanged sides of the fender as by detachable bolts 21 or permanent rivets, as desired. The strut members 20 curve forwardly on opposite sides of the wheel, as shown particularly in Fig. 3 and have central webs 22 and compound marginal reinforcing flanges 23. The flanges may be V shaped. The webs 22 of the struts extend in face-to-face contact with the bearing shoes 10, as shown in Fig. 3, the webs being apertured, as at 24 to receive the axle ends 13a, and the struts extend forwardly from the axle a substantial distance, as at 25. The tips of the forwardly projecting portions 25 may be turned inwardly as at 26.

It will be noted that the vertical depth of the strut sections increase gradually from the points of connection at 21 with the fender to the regions of connection with the axle ends so that comparatively wide bearing areas of the struts contact with the sides of the fork arms (shoes 10) to hold the struts and the fender against excessive movement horizontally. The struts may be held in position, substantially against effective fork arm sides, by enlarged apertured ends 28 of pedal or crank arms 29, which enlarged ends may be pinned as at 30 to the axle.

Now it will be seen that if the entire forward anchorage for the truss rods 20 were to comprise the axle ends (as is the usual arrangement for attaching fender-stays), any downward force applied to the fender 17, either forwardly or rearwardly from its connection 18 with the fork, could rotate the struts about the axle, allowing the fender to rub against the wheel. Since fenders for velocipedes are frequently made of very light metal, a relatively small downward force ordinarily can effect such distortion.

To minimize the likelihood of downward forces on the fender causing it to rub against the wheel, I provide a pair of rods 35 which are connected at their lower ends, as by bolts 36, with the forwardly projecting portions 25 of the struts 20, and at their upper ends to the fork near the head of the frame. These rods 35 are in the nature of truss members such as frequently found on full-size cycles, and motor-cycles, the rods being connected preferably with the steering-post supporting stem of the steering-fork unit. Each rod 35 may extend upwardly from its connection 36, and then in a sweeping curve rearwardly as at 37; the ends of the rods being attached to a bracket member 38 having ears 39 to which the ends of the rods may be secured as by clamping nuts 40 threaded to the ends of the rods. The bracket 38, in turn, may be shouldered against any suitable portion of the upper end of the stem of fork 3, say against its upper bearing cone; and an externally applied clamping sleeve such as 42 holds the bracket against such shoulder while securing the usual steering-post 43 to the fork stem. The post 43 may carry any suitable arrangement of handle-bars, such as shown at 44.

It will be seen that in the event of any horizontally applied force acting on the fender tending to rock it about the point or points of attachment 18 will be resisted directly by the struts 20 acting against the relatively short projecting ends of the axle. Should a downward force or component be applied to the rearward portion of the fender (or the forward part for that matter) the fender will be prevented from being crushed or bent against the wheel by the struts 35 which interconnect the lower strut extensions 25 and the head portion of the fork in a manner to resist, effectively, any rotational movement of the struts 20 about the axle.

I claim:

1. A fender brace and front end assembly for use in a cycle comprising, a steering wheel and an axle, a swivelled fork for supporting the axle, a fender secured in the crotch of the fork and extending downwardly circumferentially of the wheel and behind the same, a pair of struts for the fender extending from the lower end portion of the fender to a point forward of the fork arms, means to prevent movement of each strut lengthwise of itself and vertically in the region of the axle, and means interconnected between said struts forwardly of said axle and extending upwardly and connected to the fork above the axle to brace such struts against rotating movement relative to said axle.

2. A fender brace and front end assembly for use in a cycle comprising, a steering wheel and an axle, a swivelled fork for supporting the axle, a fender secured in the crotch of the fork and extending downwardly circumferentially of the wheel and behind the same, bearings at the lower end of said forks for rotatably supporting the axle, a pair of struts for the fender extending from the lower portion of the fender to points forwardly of the respective fork arms, pedal crank arms secured to the opposite ends of said axle, said struts being provided with openings to receive said axle whereby said axle prevents movement of each strut lengthwise relative to said strut and vertically in the region of the axle, said struts being disposed between respective bearings and crank arms to prevent movement of the struts axially relative to said axle, and means interconnected between the forward ends of respective struts forwardly of said axle and extending upwardly and connected to an upper portion of the fork to brace such struts against rotative movement relative to said axle, and wherein said struts each have a reinforcement extending longitudinally of the strut to reinforce the construction.

ALEXIS DE SAKHNOFFSKY.